United States Patent [19]
Hammonds

[11] Patent Number: 5,992,473
[45] Date of Patent: Nov. 30, 1999

[54] SYSTEM FOR INJECTING ADDITIVE WITHIN A FUEL TANK

[75] Inventor: Carl L. Hammonds, Humble, Tex.

[73] Assignee: Hammonds Technical Services, Inc., Houston, Tex.

[21] Appl. No.: 09/162,391

[22] Filed: Sep. 28, 1998

[51] Int. Cl.[6] .................................................... B65B 1/04
[52] U.S. Cl. .............................. 141/9; 141/100; 417/408
[58] Field of Search ............................. 141/9, 100, 104, 141/105, 234, 236, 347; 417/405, 408, 409, 375

[56] References Cited

U.S. PATENT DOCUMENTS

| | | | |
|---|---|---|---|
| 3,425,435 | 2/1969 | Garabello | 137/99 |
| 4,144,916 | 3/1979 | Alderman | 141/105 |
| 4,596,277 | 6/1986 | Djordjevic | 141/98 |
| 5,421,295 | 6/1995 | Lemaire et al. | 123/179 |

*Primary Examiner*—Henry J. Recla
*Assistant Examiner*—Huyen Le
*Attorney, Agent, or Firm*—Gary L. Bush; Mayor, Day, Caldwell & Keeton, L.L.P.

[57] ABSTRACT

A system for injecting an additive within a fuel storage tank or the fuel tank (10) of a vehicle (12) including an additive injector (22) mounted within the tubular inlet (14) of the fuel tank (10). The additive injector (22) includes an additive pump (46) driven by impeller blades (50) on an end of a pump shaft (48). The fuel discharged from the fuel nozzle (58) strikes the blades (50) to rotate the impeller (47) of pump (46) for dispensing the additive. The additive container (51) has an additive line (56) extending to a pump (46) for the supply of additive thereto for discharge from additive nozzle (54) into the flowing fuel stream. The additive is blended with the flowing fuel stream when discharged. The additive injector (22) may be utilized as a retrofit unit on an existing fuel tank by the removal of fuel tank cap (18) and the insertion of additive dispenser (22) within the tubular inlet (14). The additive container (51A) in an alternative embodiment is positioned in the fuel tank (10A) at the bottom of the body (24A) of the additive dispenser (22A).

13 Claims, 3 Drawing Sheets

SYSTEM FOR INJECTING ADDITIVE WITHIN A FUEL TANK

FIELD OF THE INVENTION

This invention relates to a system for injecting an additive into a fuel tank such as an underground storage tank for gasoline at a retail sales outlet or for a fuel tank for an engine for a vehicle (such as a car or truck or a motorcycle) or for a boat or airplane or the like, and more particularly to such a system which includes an additive dispenser mounted within the fuel tank and a method of installing the dispenser within a fuel tank.

BACKGROUND OF THE INVENTION

Heretofore, additives have normally been dispensed into a fuel tank by emptying the contents of a container within a full fuel tank. However, different amounts of fuel are normally used when a fuel tank is filled, because the tank is not normally completely empty. Also, at times, an additive may not be injected when the tank is filled. Thus, an accurate amount of an additive for each gallon of fuel added to a tank is very difficult to achieve.

It is desirable to inject a predetermined amount of additive with fuel into an underground storage tank or a vehicle fuel tank on a regular continuous basis. The term "vehicle" is used in this specification to include mainly trucks and automobiles, but it also includes any machine that has a fuel tank which supplies fuel to an engine. Thus, as used herein, the term vehicle includes boats, airplanes, motorcycles and even motor/generator sets powered by gasoline or fuel oil or irrigation pumps, and the like which do not translate from point to point on the earth. Also, it is desirable that a predetermined amount of the additive be added to the fuel while the fuel is pumped into the fuel tank so that a precise proportion of the additive relative to the fuel be added to the fuel as the fuel is pumped into the fuel tank.

SUMMARY OF THE INVENTION

The present invention is directed to a system for injecting an additive within a fuel tank, such as an underground gasoline storage tank at a retail sales outlet or a vehicle (as defined above) fuel tank including apparatus which injects the additive during the filling of the fuel tank from a fuel discharge nozzle. A pump is provided to dispense the additive within the flowing fuel stream discharged within the tubular inlet of the fuel tank. The pump is driven by a propeller positioned within the fuel inlet and struck by the fuel stream as the fuel is discharged from the fuel discharge nozzle at a service station or the like.

The additive injector or dispenser is adapted for threading onto the threaded fuel inlet of the fuel tank. The fuel inlet is normally integral with the tank and has screw threads for receiving a fuel cap or cover thereon. Thus, the additive injector of the present invention may be inserted within the inlet opening of an existing fuel tank without modification of the fuel tank. An additive reservoir may be separately mounted on the vehicle or within the fuel tank and has a supply line extending to the pump.

It is an object of this invention to provide a system for injecting an additive within a storage tank or a fuel tank of a vehicle (as defined above) which is dispensed at a flow rate depending on the flow rate of the fuel during pumping of fuel into the tank.

It is a further object of this invention to provide an additive dispenser for such a system which is driven by the fuel during discharge of the fuel from a fuel supply hose, thus providing accurate additive injection in proportion to flow without external power of any kind or a meter for proportioning.

A further object of the invention is the provision of an additive injector for a fuel tank which may be easily positioned within the fuel inlet of an existing fuel tank.

Other objects, features, and advantages of the invention will be apparent from the following specification and drawings.

DESCRIPTION OF THE INVENTION

External Additive Reservoir Embodiment

Figure 1:
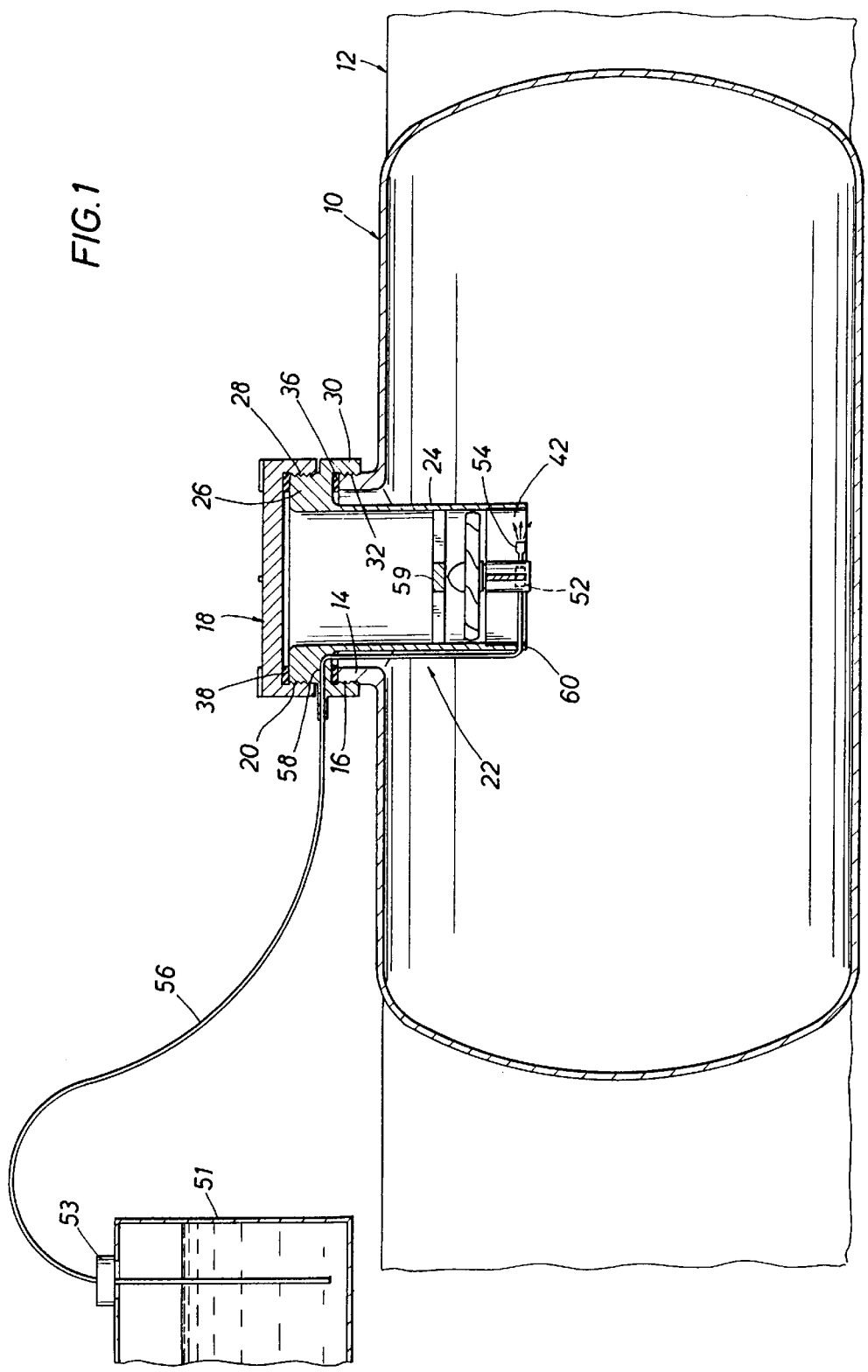
FIG. 1 is a generally schematic view of a fuel additive system for a vehicle in accordance with the present invention and having an additive reservoir separater from the fuel tank mounted on the vehicle.

Referring now to the drawings for a better understanding of this invention, a vehicle (as defined above) fuel tank generally indicated at 10 mounted on the body of a vehicle shown generally at 12 such as on the side of a truck, an automobile, a boat or motorcycle, for example. Fuel tank 10 has a tubular fuel inlet 14 with external screw threads 16 thereon. A fuel cover or cap shown at 18 has internal screw threads 20 and is normally threaded onto screw threads 16 to form a closure for tank 10.

Figure 2:
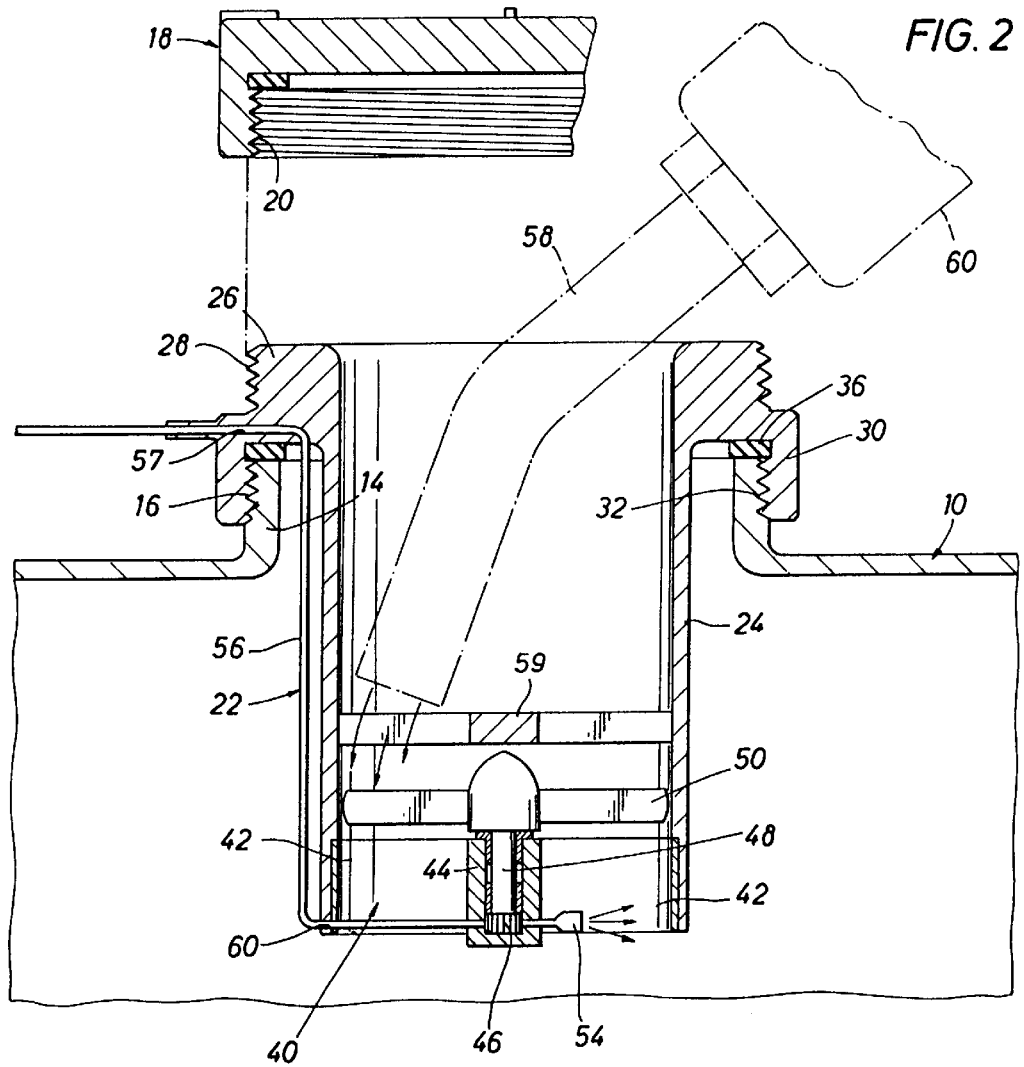
FIG. 2 is an enlarged sectional view of the additive dispenser of FIG. 1 where the dispenser is mounted within the fuel inlet of a fuel tank for a vehicle with an illustration the discharge of fuel from a fuel nozzle for powering the fuel dispenser.
Figure 3:
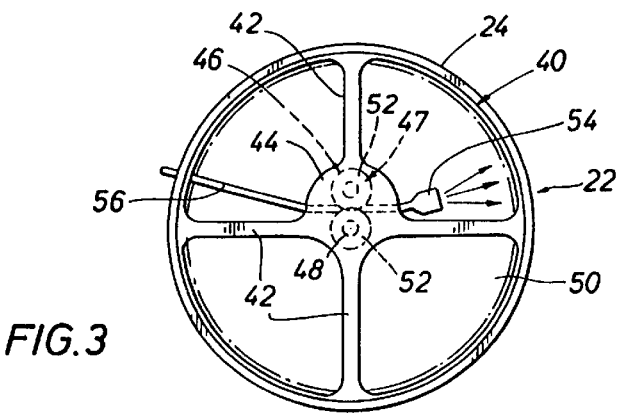
FIG. 3 is a bottom plan of the additive dispenser shown in FIGS. 1 and 2.

The additive injector comprising the present in invention is shown generally at 22 and includes a generally cylindrical body or housing 24 having an upper annular flange 26 with external screw threads 28. A downwardly extending mounting rim 30 has internal screw threads 32. Injector 22 may be easily added as a retrofit unit on an existing fuel tank by removal of cap 18 (FIG. 1) from fuel inlet 14, and then threading injector body 24 onto external screw threads 16 as shown in FIGS. 1 and 2. An annular gasket 36 is mounted between inlet 14 and injector body 22. Cap 18 may be threaded onto external screw threads 28 of injector 22 as illustrated in FIG. 1 with a suitable annular gasket 38 therebetween.

Injector 22 includes a lower inner sleeve 40 having partitions or vanes 42 secured between inner sleeve 40 and a central hub 44. Central hub 44 supports an additive gear pump 46 having gears 52 and an impeller 47 coupled with an impeller shaft 48 for rotation of gears 52. Impeller 47 has blades 50 on the upper end of shaft 48. Shaft 48 is mounted in bearings on hub 44. Flowing fuel strikes blades 50 for rotation of shaft 48 and impeller 47 for the dispensing of the additive. A suitable pump is sold under the name "PD25" of Hammonds Technical Services.

A container or reservoir is indicated at 51 (FIG. 1) for the supply of a suitable additive to pump 46 and is mounted on the vehicle 12. A removable cap 53 permits container 51 to be filled with a suitable additive as needed. An additive line 56 extends from container 51 through cap 53 and then through an upper port 57 in flange 26 of dispenser body 24. Additive line 56 then extends alongside body 24 and through a lower port 60 for the supply of additive to gear pump 46. An additive dispensing nozzle 54 extends from pump 46 for discharging additive into a flowing fuel stream for blending of the additive with the fuel. Additives, such as combustion improvers are examples of typical additives to gasoline that may be dispensed by the present invention.

A plate 59 in dispenser body 24 has apertures therethrough for the flow of fuel. A fuel nozzle shown in FIG. 2 at 58 is connected to a fuel hose 60 for the supply of fuel to dispenser 22. Plate 59 restricts the downward movement of nozzle 58. The discharge of fuel strikes the upper faces of blades 50 for rotating impeller shaft 48 and gear pump 46. Pump 46 has a suction inlet to exert a suction on additive line 56 to container 51 and has a pressure outlet to discharge additive into the flowing fuel stream from nozzle 58. Pump 46 may be designed to inject additive at a desired ratio to the fuel, such as 600 parts per million (PPM), for example. If desired, pump 46 could be adjustable to vary the particular ratio to a predetermined level.

After the discharge of fuel from fuel nozzle 58, additive dispenser 22 may be removed, if desired. However, dispenser 22 may remain in place after installation with cap 18 being positioned thereon as indicated in FIG. 1. Some fuel tanks have inlets with internal screw threads thereon and the fuel cap has external screw threads for threading within the inlet. In the event the additive dispenser is utilized with such an arrangement, the dispenser body may be provided with external screw threads for engaging the internal screw threads of the fuel inlet.

Internal Additive Reservoir Embodiment

Figure 4:
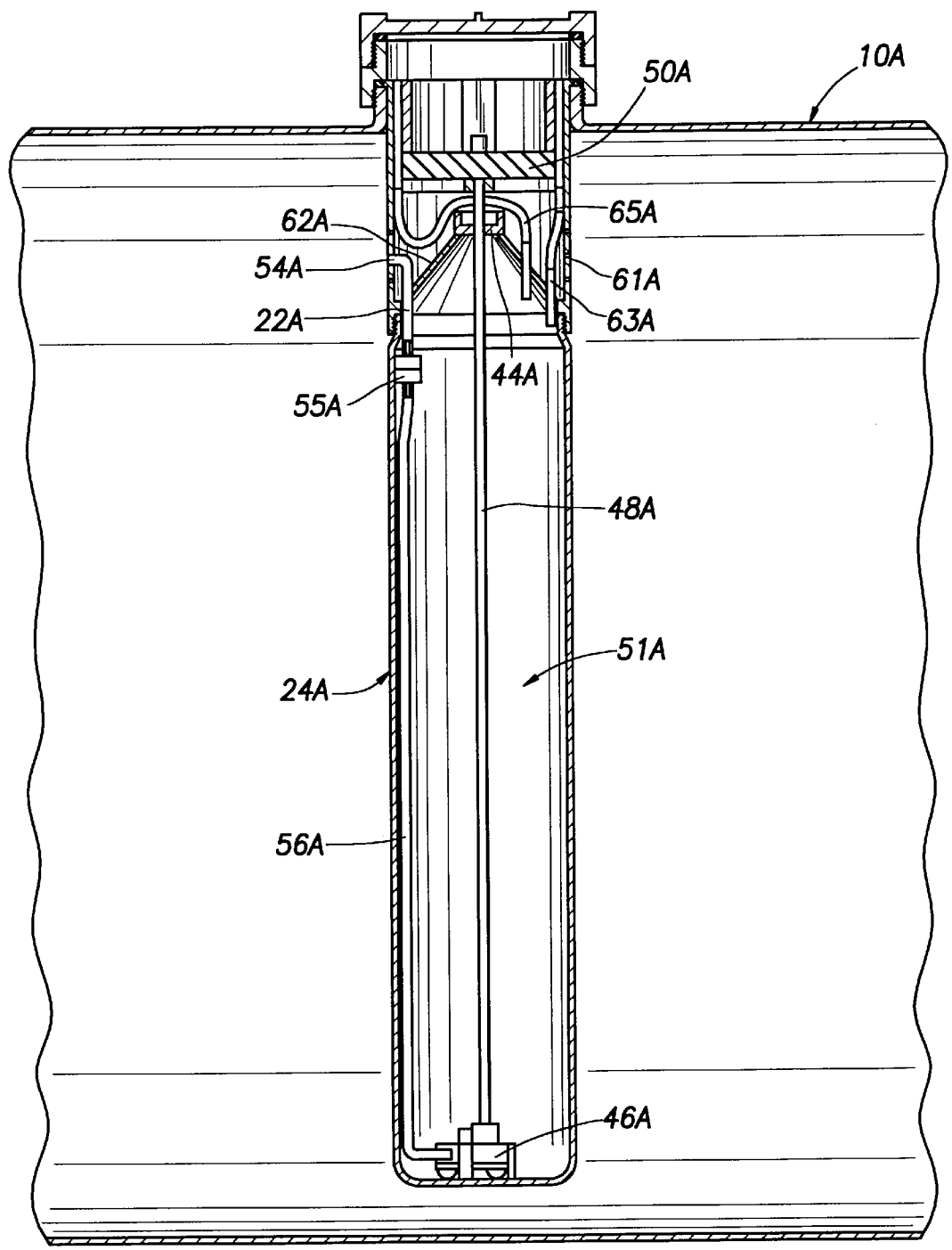
FIG. 4 is a generally schematic view of a alternative additive dispenser in which the additive reservoir is mounted within the fuel tank.

Referring to FIG. 4, an alternative additive dispenser 22A is shown in which the additive is supplied to dispenser 22A from an additive container or reservoir 51A positioned within fuel tank 10A. Housing or body 24A extends to the bottom of fuel tank 10A and includes additive container 51A at its lower end. A cap 62A is secured over container 51A. An additive pump 46A is mounted in the bottom of container 51A and is driven from a drive shaft 48A. Drive shaft 48A is mounted at its upper end in bearings within hub 44A. The impeller includes blades 50A secured to shaft 48A adjacent hub 44A. The discharge of fuel into tank 10A strikes blades 50A for rotation of shaft 48A and pump 46A which meters the flow of additive into additive line 56A for discharge from nozzle 54A. A discharge check valve is shown at 55A adjacent nozzle 54A. After striking blades 50A the fuel flows outwardly into tank 10A through a perforated or slotted section 61A of sleeve 24A above cap 62A. The rate of fuel flow into tank 10A determines the speed of rotation of shaft 48A from the fuel striking turbine blades 50A, and as a consequence the amount of additive supplied from pump 46A is determined by the rotational speed of shaft 48A. An additive fill line 63A is provided to fill container 51A with additive. A bleed line 65A extends through cap 62A to communicate container 51A to atmosphere.

Since certain changes or modifications may be made in the disclosed embodiment without departing from the inventive concepts involved, it is the aim of the appended claims to cover all such changes and modifications falling within the true spirit and scope of the present invention.

What is claimed is:

1. A system for injecting an additive within a fuel tank having an inlet, said system having an injector body defining an opening, said system adapted to be mounted to said inlet and having a portion thereof extending within said fuel tank for the discharge of fuel into the tank comprising;

an additive injector mounted within said portion of said injector body, said additive injector having an additive pump for the injection of a predetermined additive within the fuel tank; and, drive means in said portion for driving said pump by the application of fuel into said opening.

2. The system of claim 1 wherein, said pump includes an impeller, an impeller shaft, and a plurality of blades on said impeller shaft for rotation of said impeller, wherein fuel being applied into said inlet opening strikes said blades for rotation of said impeller shaft and impeller.

3. The system of claim 2 wherein, said pump is a gear pump and the flow rate of additive from said pump is proportional to the flow rate of fuel discharged into said tank.

4. The system of claim 1 wherein, said additive injector has an outer body mounted within said inlet opening and extends downwardly from said inlet opening, said body having an additive container at its lower end and said additive pump is mounted within said container.

5. The system of claim 4 wherein, said outer body has screw threads thereon and is threaded within said inlet opening for securement of said injector.

6. The system of claim 1 wherein, said additive injector has an outer body with internal screw threads;

said fuel tank having an integral tubular conduit defining said inlet opening with external screw threads therein, said additive injector being threaded within said inlet opening for mounting thereof.

7. The system of claim 6 wherein, said additive pump includes an impeller and a shaft secured to said impeller, said shaft extending longitudinally generally along the longitudinal axis of said tubular conduit; and a drive member connected to said shaft and arranged and designed for placement in the path of fuel being applied into said inlet opening for rotation of said impeller to supply additive to said fuel tank.

8. An additive injector for mounting within a tubular inlet of a fuel tank of a vehicle upon the removal of a cap for the inlet for the discharge of fluid from a fuel discharge hose through the additive injector for blending the additive with the flowing fuel stream; said additive injector comprising:

an injector body adapted to fit within the tubular inlet and having a portion thereof extending within the fuel tank;

a container having a supply of additive therein; and an additive dispenser within said portion of said injector body having means within said portion driven by the filling of fuel into said tubular inlet for effecting the supply of additive from said container to said additive dispenser.

9. The additive injector of claim 8 wherein, said additive dispenser includes an additive pump and an impeller operatively connected to said pump for rotation of said pump, said impeller having blades positioned in the path of a flowing fuel stream formed by the application of fuel into said tubular inlet and being rotated when the flowing fuel strikes said blades.

10. The additive injector of claim 9 wherein, said additive injector has an outer body mounted within said inlet opening, said outer body extending downwardly from said inlet opening;

said body having said additive container at its lower end; and said additive pump is mounted within said container.

11. The additive injector of claim 10 wherein, said outer body has screw threads thereon and is threaded within said inlet for securement of said injector.

12. A method of installing an additive injector within a threaded tubular inlet of a fuel tank for a fuel tank having a threaded cap engaging the threaded tubular inlet, the additive injector including an outer body having a pump therein for the additive; said method comprising the steps of, providing screw threads on said outer body;

removing said threaded cap from said threaded tubular inlet;

threading said outer body within said threaded tubular inlet; and replacing said threaded cap on said tubular outlet.

13. A method for injecting an additive within a fuel tank which has an inlet opening for the filling of fuel; said method comprising the steps of, providing an additive injector having an outer body with a portion thereof extending within said fuel tank and a pump in said portion for receiving the additive from an additive supply, the pump having an impeller and a shaft connected to the impeller, providing a plurality of blades on said shaft for rotation of said shaft and impeller upon fuel striking said blades;

placing said additive injector within the inlet opening of said fuel tank with said blades exposed; and applying fuel into said inlet opening with the fuel striking said blades for rotation of said blades and impeller for injecting additive within the fuel tank at a fluid flow rate proportional to the fluid flow rate of fuel applied into said inlet.

* * * * *